(12) United States Patent
Purdey (10) Patent No.: US 9,194,256 B2
(45) Date of Patent: Nov. 24, 2015

(54) ROTATING MACHINE WITH SHAFT SEALING ARRANGEMENT

(75) Inventor: Matthew J Purdey, Huddersfield (GB)

(73) Assignee: CUMMINS TURBO TECHNOLOGIES LIMITED, Huddersfield (GB)

( * ) Notice: Subject to any disclaimer, the term of this patent is extended or adjusted under 35 U.S.C. 154(b) by 652 days.

(21) Appl. No.: 13/262,787

(22) PCT Filed: Apr. 1, 2010

(86) PCT No.: PCT/GB2010/000655
§ 371 (c)(1),
(2), (4) Date: Oct. 3, 2011

(87) PCT Pub. No.: WO2010/112864
PCT Pub. Date: Oct. 7, 2010

(65) Prior Publication Data
US 2012/0027569 A1 Feb. 2, 2012

(30) Foreign Application Priority Data
Apr. 2, 2009 (GB) .................................. 0905697.9

(51) Int. Cl.
*F01D 25/18* (2006.01)
*F01D 11/00* (2006.01)
*F02C 6/12* (2006.01)

(52) U.S. Cl.
CPC .............. *F01D 25/186* (2013.01); *F01D 11/00* (2013.01); *F02C 6/12* (2013.01); *F05D 2220/40* (2013.01);

(Continued)

(58) Field of Classification Search
CPC ..... F01D 25/18; F01D 25/183; F01D 25/186; F05D 2260/6022; F04D 29/10; F04D 29/104; F04D 29/102; F04D 29/12; F04D 29/122; F04D 29/128
USPC ............ 415/111, 110, 112, 113, 168.1, 168.2
See application file for complete search history.

(56) References Cited

U.S. PATENT DOCUMENTS 4,477,223 A 10/1984 Giroux
4,664,605 A 5/1987 Asano et al.
(Continued)

FOREIGN PATENT DOCUMENTS

EP 1 179 655 A2 2/2002
EP 2 107 218 A2 10/2009
(Continued)

OTHER PUBLICATIONS

United Kingdom Search Report GB0905697.9, Cummins Turbo Technologies Limited, Jul. 16, 2009.
(Continued)

*Primary Examiner* — Nathaniel Wiehe
*Assistant Examiner* — Michael Sehn
(74) *Attorney, Agent, or Firm* — Taft, Stettinius & Hollister LLP (57) ABSTRACT

A rotating machine comprising such as an axial power turbine or a turbocharger has a housing with a bearing cavity and a chamber separated by a first wall. A shaft is rotatable about an axis in the bearing cavity, extends through an opening in the first wall and is mounted for rotation on a bearing assembly provided in the bearing cavity. An oil sealing arrangement including an oil diffuser device is arranged on the shaft for displacing oil away from the shaft as it rotates. This restricts the flow of oil to the opening. The oil diffuser device defines a diffuser passage between the bearing assembly and the first wall, the passage extending outwardly of the axis.

19 Claims, 5 Drawing Sheets

(52) U.S. Cl.
CPC ....... *F05D 2240/126* (2013.01); *F05D 2240/70* (2013.01); *F05D 2250/324* (2013.01); *F05D 2260/6022* (2013.01)

(56) References Cited

U.S. PATENT DOCUMENTS

| | | | |
|---|---|---|---|
| 5,028,205 A * | 7/1991 | Kapadia et al. | 415/112 |
| 5,605,045 A * | 2/1997 | Halimi et al. | 60/607 |
| 6,030,176 A * | 2/2000 | Oeynhausen | 415/214.1 |
| 6,220,829 B1 * | 4/2001 | Thompson et al. | 417/407 |
| 6,929,449 B2 * | 8/2005 | Zagone et al. | 415/206 |
| 7,008,194 B2 * | 3/2006 | Frankenstein | 417/407 |
| 7,112,033 B1 * | 9/2006 | Holdorf | 415/1 |
| 2004/0119238 A1 * | 6/2004 | Skumawitz et al. | 277/412 |
| 2008/0152478 A1 * | 6/2008 | Yen et al. | 415/111 |

FOREIGN PATENT DOCUMENTS

| | | |
|---|---|---|
| GB | 356062 | 9/1931 |
| GB | 2 055 159 A | 2/1981 |
| GB | 2 091 356 A | 7/1982 |
| JP | 57020518 | 2/1982 |
| WO | WO 2008/065359 A2 | 6/2008 |

OTHER PUBLICATIONS

International Search Report, PCT/GB2010/000655, Cummins Turbo Technologies Limited, Jun. 23, 2011, International Searching Authority/European Patent Office.

Written Opinion, PCT/GB2010/000655, Cummins Turbo Technologies Limited, Oct. 2, 2011, International Searching Authority/European Patent Office.

Examination Report in GB Application No. 0905697.9, dated Feb. 11, 2015.

* cited by examiner

ROTATING MACHINE WITH SHAFT SEALING ARRANGEMENT

RELATED APPLICATIONS

The present application is a 35 USC section 371 national stage patent application filing from PCT/GB 2010/000655 claiming priority to United Kingdom Patent Application No. 0905697.9 filed Apr. 2, 200, both of which are incorporated herein by reference.

The present invention relates to a rotating machine such as, for example, a turbomachine with a shaft sealing arrangement. The invention has particular, but not exclusive, application to a turbomachine in the form of a turbocharger or a power turbine.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is conventionally supported by journal and thrust bearings, including appropriate lubricating systems, located within a central bearing housing connected between the turbine and compressor wheel housing. Providing an effective sealing system to prevent oil leakage from the central bearing housing into the compressor or turbine housing can be problematic. Oil leakage is regarded as a particular problem at the compressor end of the turbocharger since at low boost pressures (e.g. when the engine is idling or when the turbocharger is operated in engine braking mode) there can be a significant pressure drop from the bearing housing to the compressor housing which encourages oil leakage into the compressor housing. In order to counter such leakage it is conventional to include an oil slinger as part of a thrust bearing assembly at the compressor end of the bearing housing. An oil slinger is an annular component which rotates with the turbocharger shaft and has surfaces or passages arranged for propelling oil away from the shaft as it rotates, and in particular from the passage through the bearing housing into the compressor housing. Generally an annular splash chamber defined in the bearing housing collects the oil displaced by the slinger provides for its recirculation and typically allows it to drain to a sump.

It is important for a turbocharger shaft sealing arrangement to be able to withstand the increasingly high boost pressures that are delivered by modern turbochargers. The pressure of the bearing housing is effectively at the same pressure as the engine oil sump (typically around up to 100 millibar) and there is thus a pressure gradient between the bearing housing and the compressor and turbine housings. A significant pressure differential can also be set up between the bearing and turbine housing when an exhaust gas engine braking arrangement is employed at the turbine outlet as this creates back pressure. The sealing arrangement must thus be able to restrict "blow-by" gas flow from the relatively high-pressure regions of the turbine and compressor housings into the relatively low-pressure region of the bearing housing, without impairing its ability to restrict oil leakage.

Whereas the turbine of a turbocharger drives a compressor, in a power turbine the end of the turbine shaft remote from the turbine wheel transmits power via a mechanical coupling. In a turbocompound engine two turbines are provide in series with a power turbine connected in series with the turbine of a turbocharger. The power turbine is used to generate additional power and a gear wheel may be fixed to the end of the power turbine shaft in order to transmit that power to the crankshaft of the engine via an appropriate coupling (such as for example a fluid coupling or a gear or other drive mechanism), hydraulically, mechanically or electrically. As with a turbocharger, the shaft of a power turbine is supported on bearing assemblies, including appropriate lubricating systems, located within a bearing housing connected to the turbine housing. The bearing arrangement at the turbine end of the shaft may be substantially the same as that found in a turbocharger, although the bearing arrangement at the drive end of the shaft may be a ball bearing assembly.

In turbocharger applications where the shaft rotation speeds can reach high rates positive contact seals are undesirable as they would be subject to significant wear at the contact surfaces and would contribute to high friction losses. Non-contact sealing arrangements are thus generally adopted.

In an axial power turbine there is typically provided a sealing boss fixed (e.g. welded) to the turbine shaft between the turbine wheel and a bearing assembly disposed in a bearing housing. Sealing is typically provided by one or more piston-type ring seals seated in annular grooves defined in an outer surface of the sealing boss or in the housing and which serve to restrict gas flow from the turbine housing along the shaft and into the bearing housing. An oil slinger may also be provided on the shaft to direct oil away from the sealing boss. For an axial power turbine the pressure within the bearing housing is generally higher than the pressure in the turbine housing behind the turbine wheel across most, if not all, of the operating range. This is because pressures below atmospheric pressure can be generated behind the turbine wheel thus allowing gas flow across the ring seals from the bearing housing and into the turbine housing. The pressure drop from the bearing housing to the turbine housing can thus exacerbate the problem of oil leakage from the bearing housing into the turbine housing, and thus into the exhaust gas flow. In the high temperature environment of the turbine housing the oil can coke and pollutes the environment into which it is exhausted.

One of the objects of the present invention, amongst others, is to obviate or mitigate the problems associated with oil leakage in a rotating machine, such as a turbomachine, comprising a rotational shaft passing through a wall.

According to a first aspect of the present invention there is provided a rotating machine comprising: a housing defining a bearing cavity and a chamber separated by a first wall; a shaft rotatable in the bearing cavity about an axis and extending through an opening in the first wall, the shaft being mounted for rotation on a bearing assembly provided in the bearing cavity; an oil sealing arrangement for displacing oil away from the shaft as it rotates thereby restricting the flow of oil to the opening; the oil sealing arrangement comprising an oil diffuser device defining an oil passage disposed between the bearing assembly and the first wall for guiding oil and diffusing flow, the passage extending outwardly of the axis and having a radially inner first portion that extends in a first direction with a dominant radial component and a second portion outboard of the radially inner portion and extending in a second direction with a greater axial component than the first direction.

In such an oil diffuser, the surface area of the oil increases as it progresses along the passage outwardly of the shaft, the flow area increasing by virtue of the increasing diameter of the circle at the leading edge of the oil. The resulting increase in oil pressure in the flow direction (away from the shaft) decelerates the flow so that the flow velocity decreases.

The flow is decelerated such that the oil is not subject to significant separation or cavitation and flows as a contiguous body. The slow movement of the oil along the length of the passage ensures that when it emerges from the outlet it pours out rather than being slung or spattered in droplets, the gravitation and surface tension forces dominating over other forces.

The surfaces that define the passage both have a first portion that extends in the first direction and a second portion that extends in the second direction. The surfaces may both be curved.

The first direction of the first portion of the passage may be exclusively or substantially radial, that is there is little or no axial component. In alternative embodiments of the invention the axial component of the first direction may be more significant but not as significant as the dominant radial component.

The second portion of the diffuser passage may extend in a direction away from the first wall, which direction may be substantially axial. The first portion may extend in a substantially radial direction from a location proximate the shaft. The first and second portions combine to define a generally "bowl" shaped passage. There may be at least one further portion outboard of the second portion and which extends in a different direction compared to the second portion.

The passage may have an outlet end that may be radially and axially offset from an inlet end. The passage may be substantially annular.

The oil diffuser device may comprise a fixed member that is designed not to rotate with the shaft and may define a first surface, and a rotatable member for rotation with the shaft which may define a second surface, the first and second surfaces facing each other and defining the diffuser passage between them. The fixed member may be defined, for example, by the housing. The rotatable member of the diffuser device may take any suitable form and may, for example, be substantially disc-shaped with a bore in which the shaft is received. The rotatable member may be substantially planar or may be non-planar and configured such that the diffuser passage is directed away from the opening. The second surface may have an outer periphery that is curved in a direction away from the first wall e.g. it may be approximately concave. The rotatable member may be substantially dish-shaped with the second surface having a curvature of substantially constant radius or varying radius. The second surface may be roughened or may define asperities.

The oil flow may emerge from the outlet on the rotatable member.

The first surface may be provided with at least one projection (e.g. a rib or vane) or depression (e.g. a groove or channel) for directing oil flow. Alternatively, the at least one projection may be designed to slow the oil flow along the passage. Similarly, the second surface may have at least one depression for promoting turbulence in the oil as it flows along the passage. Alternatively, or in addition, it may have an oil collection trough.

The rotatable member may be disposed in the bearing cavity such that there is a small annular clearance between its outer periphery and a neighbouring wall of the housing.

The oil sealing arrangement may further comprise a labyrinth member disposed around the shaft for defining at least one oil collection chamber between the oil diffuser device and the first wall.

The at least one oil collection chamber may be defined between the labyrinth member and a wall portion of the bearing cavity and is arranged to collect oil that passes through said small annular clearance. The labyrinth member may have at least one surface that is inclined with respect to the shaft axis for directing collected oil away from the shaft towards a drain.

There may be provided a plurality of oil collection chambers arranged to receive oil in sequence.

The sealing assembly may further comprise at least one seal ring disposed around the shaft within the opening to seal the shaft with respect to the first wall. There may be a second seal disposed around the shaft.

There may be a heat shield disposed between the first wall and the chamber, a heat shield cavity being defined between the first wall and the heat shield; the shaft may extend from the chamber into the bearing cavity through a passage defined at least in part by a first aperture in said first wall and a second aperture in the heat shield.

The second seal may be provided between the shaft and said second aperture. The second seal may comprise one or more seal rings, such as for instance a split ring seal.

In some embodiments there may be an annular gap defined between said wall and the heat shield between said first and second apertures.

The shaft may have a first enlarged diameter portion which is located and rotates within said passage. The enlarged diameter portion of the shaft may define a generally radially extending annular wall which faces (and possibly abuts) the sealing arrangement. The annular wall may be configured to propel oil radially away from said shaft as said shaft rotates. The oil may be propelled into one of the plurality of oil collecting chambers.

The shaft may have a second enlarged diameter portion which is smaller than the first enlarged diameter portion, the labyrinth member being located around the second enlarged diameter portion. The labyrinth member may be substantially cylindrical with a central boss located around the shaft. It may have a frustoconical portion for directing off in a predetermined direction.

The heat shield may be formed integrally with the housing wall or may be provided as a separate component. For instance, a portion of the housing defining said heat shield and said wall may comprise a single component, e.g. a single casting.

The rotating machine may be in the form of a turbomachine. For example, it may be a turbocharger including a turbine housing or a compressor housing defining the chamber, and a bearing housing defining said bearing cavity.

The turbocharger may be fitted to an internal combustion engine which may encompassed in a powered vehicle.

Alternatively, the turbomachine may be an axial flow power turbine including a turbine housing defining the chamber, and a bearing housing defining said bearing cavity. The axial flow power turbine may be incorporated in a turbo-compound engine such that it is connected downstream of a turbine of a turbocharger.

The turbomachine may be designed such that the shaft is rotatable at speeds of between 20,000-100,000 r.p.m. The invention is intended such that the oil egresses from the diffuser passage in a controlled fashion at such shaft speeds i.e. it does not emerge as a spray but rather pours in a direction towards a drain.

The first seal may comprise one or more ring seals, including for instance a split overlapping ring seal.

According to a second aspect of the invention there is provided a rotating machine comprising: a housing defining a bearing cavity and a chamber separated by a first wall; a shaft rotatable in the bearing cavity about an axis and extending through an opening in the first wall, the shaft being mounted for rotation on a bearing assembly provided in the bearing cavity; an oil sealing arrangement for displacing oil away from the shaft as it rotates thereby restricting the flow of oil to the opening; the oil sealing arrangement comprising an oil diffuser device defining an oil passage for guiding and diffusing the oil flow, the passage being disposed between the bearing assembly and the first wall, the passage extending outwardly of the axis and being defined by first and second surfaces spaced apart such that, as the shaft rotates, oil flows along the passage as a body in contact with the first and second surfaces and decelerates such that gravitational and surface tension forces dominate and cause the oil to pour from the passage.

The passage allows the body of oil to flow in a substantially continuous form. The diffuser allows the oil to pour out of the passage under the influence of gravity such that it emerges substantially within a limited and predictable angular range and that it can be directed easily to a suitable drain. The particular size of the range is not important In the second aspect of the invention the rotating machine may optionally have many of the features referred to in preceding paragraphs. It will be understood that in the second aspect of the invention the passage may or may not change direction and may, for example, be substantially or primarily radial only.

In both the first and second aspects of the invention the deceleration of the oil is effected by the increasing area of the body of oil as it moves in a direction outwardly of the shaft axis. The consequent reduction in energy in the oil allows gravitational forces and/or surface tension to dominate such that the oil pours out of an outlet end of the passage and can be directed easily to an appropriate drain. This is in contrast to a conventional oil slinger arrangement in which the oil is broken up and egresses outwardly as a spray in a predetermined direction.

The distance between the first and second surfaces may increase along the passage.

According to a third aspect of the present invention there is provided a method of reducing oil leakage in a rotating machine comprising a housing defining a bearing cavity in which a shaft is arranged for rotation and a chamber separated by a first wall; the method may comprise using an oil diffuser around said shaft to direct oil along a diffuser passage away from the shaft as it rotates and away from said chamber, the oil diffuser serving to reduce the flow speed of the oil as it travels along the passage such that gravitational and surface tension forces dominate and the oil pours from an outlet of the passage Specific embodiments of the present invention will now be described, by way of example only, with reference to the accompanying drawings, in which:

FIGS. 3a to 3d are representations of alternative embodiments of part of an oil diffuser forming part of the oil sealing arrangement of FIGS. 2 and 2a;

FIG. 5a is a schematic front view of an embodiment of a rotating wall of the oil diffuser; and FIG. 5b is a sectioned side view of the oil diffuser incorporating the rotating wall of FIG. 5a.

Figure 1:
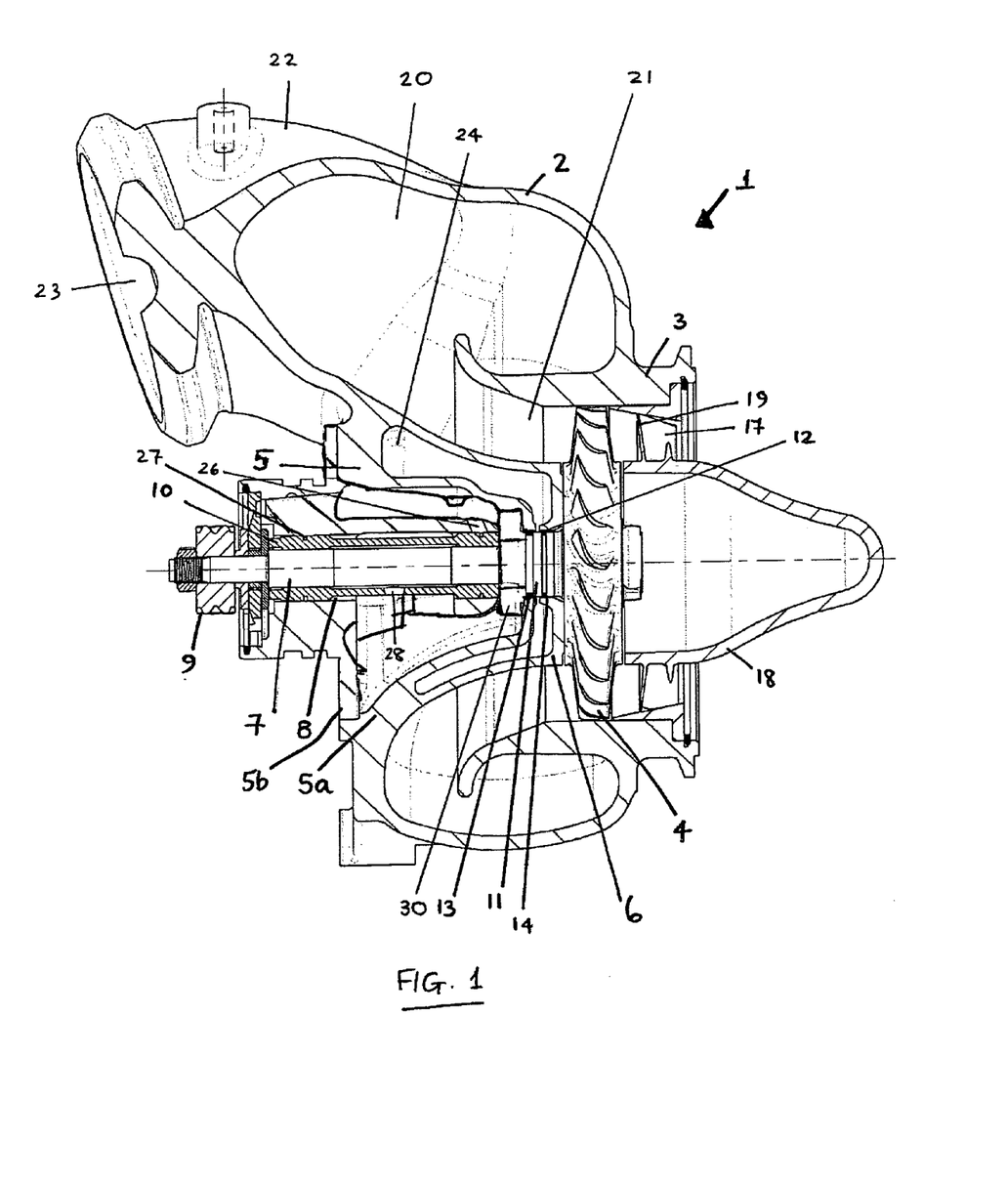
FIG. 1 is a cross-section through an axial flow power turbine in accordance with an aspect of the present invention.
Figures 2, 2A:
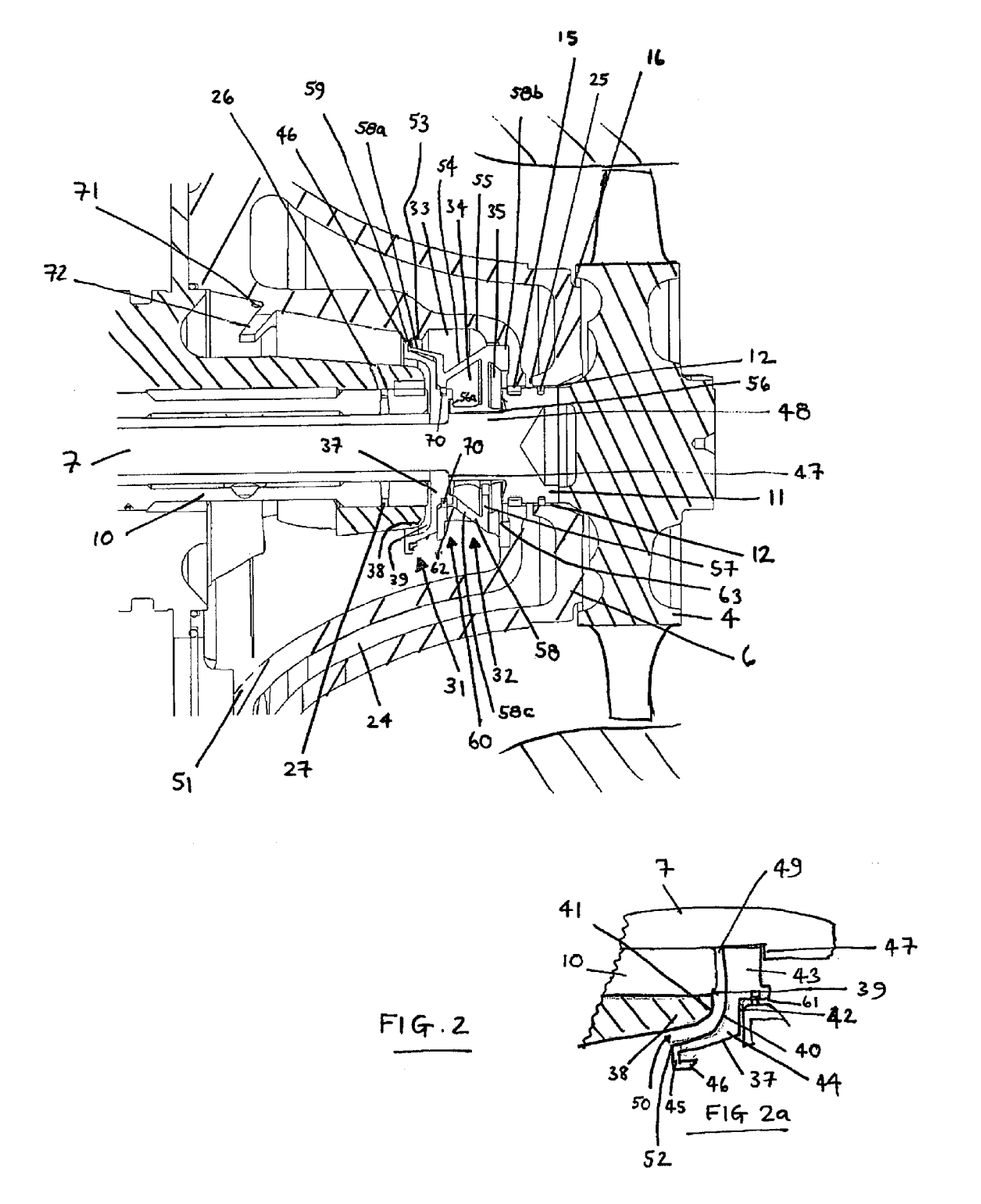
FIG. 2 is an enlarged and more detailed view of part of the turbine of FIG. 1, illustrating in more detail an oil sealing arrangement adjacent to the turbine wheel.
FIG. 2a is an enlarged view of part a shaft sealing arrangement of FIG. 2.

Referring to FIGS. 1 and 2, the exemplary rotating machine is in the form of an axial flow power turbine 1 that has a cast housing 2 and defines a turbine housing portion 3 in which a turbine wheel 4 is supported and a bearing housing portion 5 in which bearing and sealing arrangements are disposed. The housing 2 also defines an integral heat shield 6 in the form of a wall that separates the hot exhaust gas flow through the turbine housing portion 3 from the bearing housing portion 5 to reduce heat transfer to the bearing housing portion 5 which could otherwise result in overheating of the bearings.

A shaft 7 extends through a chamber 8 defined in the bearing housing portion 5, through the heat shield 6 and supports, at one end, the turbine wheel 4 and at the other end a drive gear 9. The shaft 7 is supported for rotation about its longitudinal axis in the bearing housing portion 5 by a one-piece tubular bearing 10.

The bearing housing portion 5 is itself in two parts so as to allow insertion of the shaft 7 into the housing with the bearing and sealing arrangements supported thereon. The shaft 7 is inserted into the first part 5a of the housing portion 5 and through the heat shield 6 and then the second part 5b of the bearing housing portion 5 is used to close the chamber 8.

At the turbine end, the shaft 7 defines seal boss 11 that rotates within a passage 12 defined in part by an aperture 13 in a wall of the bearing housing portion 5, and in part by an aperture 14 through the heat shield 6. The turbine wheel 4 is joined to the shaft 7 at the seal boss 11. Generally the seal boss 11 is formed integrally with the shaft 7 (and as such forms part of the shaft) and is joined (for instance by friction welding) to a boss portion on the back of the turbine wheel 4. The seal boss 11 is sealed with respect to the passage by a first seal ring 15 which provides a gas seal between the seal boss 11 and the aperture 13 defined by the bearing housing 5, and a second seal ring 16 which provides a gas seal between the seal boss 11 and the aperture 14 defined by the heat shield 6. The seal rings 15, 16 are designed to inhibit gas leakage through the apertures 13, 14 and are preferably split overlapping ring seals (often referred to as "piston rings"), each located in respective annular grooves defined in the outer surface of the seal boss 11.

The turbine housing portion 3 comprises an axial annular inlet passage 17 defined around a domed nozzle 18 and includes a stationary annular vane array 19 upstream of the turbine wheel 4. Exhaust gas flows through the annular inlet passage 17, through the turbine wheel 4, and into an annular collector portion 20 of the turbine outlet via an annually flared turbine diffuser portion 21 which is an extension of the inlet passage 17. Gas exits the turbine via an outlet 22 which comprises the annular collector portion 20 and an outlet port 23.

The exhaust gas flow path through the turbine housing portion 3 is separated from the bearing housing portion 5 by the integral heat shield 6 which also defines part of the turbine housing diffuser portion 21 and annular collector portion 20. A heat shield cavity 24 is defined between the heat shield 6 and the bearing housing portion 5 and a passage extends through the turbine housing portion 3 to the cavity 24.

An annular gap 25 (FIG. 2) is defined between the bearing housing 5 and heat shield 6 adjacent to the passage 12 and serves to provide fluid communication between the cavity 24 and that portion of the passage 12 that extends between the first and second seal rings 15, 16.

Oil is supplied to the bearing housing 5 for lubrication of the bearing 10 and passes to the bearing through oil passages 26 at each end of the housing (only one such passage is shown in FIGS. 1 and 2). The bearing 10 is provided with oil passageways 27 which permit oil to flow through the bearing 10 to the shaft 7. An aperture 28 in a central portion of the bearing 10 ensures that oil can drain freely from the inner bearing surfaces.

The oil supply to the bearing housing 5 can come from any appropriate source. When the power turbine is used as part of a turbocompound arrangement the oil will typically be delivered from the pressurised oil supply system of a combustion engine, for instance via an oil feed from the combustion engine crank case (not shown). Similarly, the oil may drain from the bearing housing to a sump which may be the oil sump of the internal combustion engine, or a gear box oil sump. It will be appreciated that other oil supply arrangements are possible.

The pressure within the bearing housing will vary during operation of the turbine, but will generally be higher than the pressure in the turbine housing behind the turbine wheel 4. This is particularly the case for an axial flow power turbine as pressures below atmospheric pressure can be generated behind the turbine wheel 4. The pressure drop from the bearing housing 5 to the turbine housing 3 can exacerbate the problem of oil leakage from the bearing housing into the turbine housing, and thus into the exhaust gas flow. In accordance with the present invention this problem is addressed by introducing an oil sealing arrangement between the bearing 10 and the seal boss 11. This is represented schematically in FIG. 1 by reference number 30 and is shown in more detail in FIGS. 2 and 2a.

The oil sealing arrangement 30 comprises an oil diffuser 31 and a labyrinth member 32 that combines with the bearing housing 5 and the diffuser 31 to define a plurality of collection chambers 33-35 arranged in sequence along the shaft 7 between the diffuser 31 and the seal boss 11 for collecting oil and directing it through respective drain openings at the bottom. In the environment of a turbine bearing housing 5 the oil is often entrained in a gas in the form of a fine mist that flows in the axial direction from the bearing 10 towards the turbine housing portion 3 in view of the prevailing pressure gradient.

The oil diffuser 31 is defined by a disc-like diffuser wall 37 that is fixed to the shaft 7 for rotation therewith and an adjacent fixed wall 38 of the bearing housing. The rotating wall 37 and the fixed wall 38 define between them a diffuser passage 39 that extends outwards from the rotational axis of the shaft 7. In the particular embodiment shown the disc-like wall 37 has a first surface 40 facing the bearing 10 and a surface 41 of the fixed wall 38, and an opposite second surface 42 that faces the labyrinth member 32. The wall 37 has inner section 43 that defines a substantially radial part of the first surface 40 and a central bore in which the shaft 7 is received, an intermediate arcuate section 44 that defines an arcuate part of the first surface 40 that faces a corresponding arcuate portion of the surface 41 of the fixed wall 38, and a radially outermost peripheral section 45 in the form of a radially extending flange with a terminal lip 46 extending in an axial direction towards the labyrinth member 32. The shaft 7 is stepped radially outwards between the bearing 10 and the boss 11 so as to define an annular shoulder 47 again which the rotating wall 37 is retained and an enlarged portion 48 on which the labyrinth member 32 is supported.

The diffuser passage 39 extends between the first surface 40 of the rotating wall 37 and the facing surface 41 of the bearing housing 5 from an inlet end 49 adjacent to the shaft 7 to a radially and axially offset outlet end 50. It extends first in a substantially radial direction and is then curved in a direction away from the turbine wheel 4 so that oil exiting the diffuser passage 39 is directed away from the seal boss 11. The exact directions of the first and second portions of the passage may vary but the first portion will generally have a more dominant radial component whereas the second portion will generally have an axial component that is stronger than the first portion. Other examples are described below.

In operation, as the shaft 7 rotates, oil exits the turbine end of the bearing 10 in an axial direction and enters the inlet end 49 of the diffuser passage 39. From there the oil progresses along the passage 39 in a generally radially outwards direction and then through an approximate right angle to the outlet end 50 from which it egresses towards a main drain 51 at the bottom of the bearing housing 5 with an axial component that is in the opposite direction to its initial direction upon leaving the bearing 10. The diffuser passage 39 is divergent as it extends between the inlet and outlet ends 49, 50 i.e. the distance between the first and second surfaces increases along the length of the passage. The increasing cross-sectional area of the passage 39 from the inlet to the outlet end has the effect of reducing the flow rate and viscosity of the oil such that it exits a bottom 52 of the outlet end 39 in a slow and controlled fashion. Initial tests have established that the oil pours in a controlled fashion from this location even at high rotational speeds of the shaft 7. Any oil that is slung from first surface 40 of wall 37 tends to land on the facing surface 41 of the bearing housing 5 from where it flows under gravity over the surface towards the main drain 51.

The peripheral surface of the lip 46 is designed to be in close proximity to an adjacent wall portion 53 of the bearing housing so as to restrict the size of the clearance between the member 37 and the surrounding surface of the bearing housing. This restricts the area available to the oil mist or spray to pass the member 37. Any oil that does get past the diffuser 31 in this direction enters a first collection chamber 33 that is defined between a radially outer surface 54 of the labyrinth member 32 and a radially inward facing surface 55 of the bearing housing 5. In the particular embodiment depicted in FIG. 2, the labyrinth member 32, which is fixed to the bearing housing 5 so that it does not rotate with the shaft 7, comprises an inner cylindrical boss 56 that is disposed around the enlarged section 48 of the shaft, a radially extending web 57 and an outer wall 58 that is substantially annular. A first end 58a of the outer wall, adjacent to the rotating wall 37 of the diffuser, is radially convergent from a tip 59 that fits under the lip 46 of the rotating wall 37. The opposite second end 58b of the outer wall 58 is substantially cylindrical with an increased thickness and abuts the portion of the bearing housing 5 that defines the aperture 13 around the seal boss 11. An intermediate portion 58c of the outer wall 58 that interconnects the first and second ends 58a,b comprises a substantial frustocone portion that extends inwards from the second end 58b to a radial portion that joins with the first end 58a. The labyrinth member 32 may be made of any suitable material and may be integrally formed as shown or otherwise configured from several pieces.

The labyrinth member 32 defines a second collection chamber 34 between the intermediate portion 58c of the outer wall, the central boss 56, radial wall 57 and part of the rotating wall 37 of the diffuser 31. A third collection chamber 35 is defined between the second end 58b of the outer wall 58, the central boss 56, the radial wall 57 and an edge of the seal boss 11.

In the first collection chamber 33 the oil is isolated from the shaft 7 and is directed by the outwardly facing surface 54 of the frustocone of the intermediate portion 58c of the outer wall 58 on to the facing surface 55 of the bearing housing. From there it flows under gravity on to an inwardly facing surface of the wall of the diffuser portion 21 at the bottom of the turbine housing 3 and then out through a drain port 60 to the main drain 51.

The second surface 42 of the rotating wall 37 has an annular shoulder 61 (FIG. 2a) with a groove in which a ring seal 70 (FIG. 2) is received for sealing between the diffuser 31 and the labyrinth member 32. The ring seal 70 is supported on an edge of the radial part the intermediate portion 58c of outer wall 48 and extends into the groove with a small radial and axial clearance so as to permit relative rotation of the wall 37 and the labyrinth member 32. Any oil that manages to egress between the labyrinth member 32 and the rotating wall 37 of the diffuser 31 at the interface between the tip 59 of the first end 58a of the outer wall and the lip 46 passes between the two where it encounters the ring seal 70. The interface of between the tip and the lip 46 affords a small clearance to allow relative rotation of the wall 37 and the labyrinth member 32 but also provides for a pumping action that resists any flow of oil through the clearance. Similarly the ring seal 70 is designed to restrict oil leakage.

Should the oil manage to pass through the interface and the ring seal 70 it egresses into the second collection chamber 34 where it collects on the inwardly facing surface of the frustocone of the intermediate portion 58c of the outer wall 58 of the labyrinth member 32 and flows under gravity to the bottom of the chamber and out through a drain port 62.

The central boss 56 of the labyrinth member 32 has a terminal foot 56a that is adjacent to inner section of the rotating wall 37 and the relative proximity provides a pumping action to restrict oil flow between them when the shaft and the wall 37 is rotating. Any oil that passes between the foot 56a and the diffuser 31 flows in a small radial clearance between the shaft 7 and the boss 56 whereupon it encounters an undercut annular edge of the seal boss 11 (described in our U.S. Pat. No. 7,086,842 the content of which is incorporated herein by reference) that acts as a slinger to direct the oil away from the turbine wheel 4 and into the surrounding third collection chamber 35. The roof of this chamber 35 is defined by the second end 58b of the outer wall 58 and has an inclined inwardly facing surface so as to allow collected oil to flow under gravity to the bottom of the chamber and out through a drain port 63.

In all instances oil that passes out through drain ports 61-63 of the respective collection chambers 33-35 is directed to the main drain 51 by the wall 21 of the turbine housing diffuser.

One or more pressure balance holes 71 (only one shown in FIG. 2) may be provided between the heat shield cavity 24 and the bearing housing to balance the pressure difference across the inboard seal ring 15. This equalisation of pressure means that there is no pressure drop across the first ring seal that would otherwise encourage passage of the oil spray or mist over it. In order to reduce the risk of oil passing through the hole 71a splash guard 72 projects in front of the hole so as to protect it from any oil mist or spray.

It will be appreciated that the configuration of the labyrinth member 32 and the collection chambers 33-35 may take any appropriate form for restricting passage of the oil towards the interior of the turbine housing.

Although seal rings 15, 16 and are proposed, alternative seal arrangements may be provided between the shaft seal boss 11 and the bearing housing 5 as well as between the shaft seal boss 11 and the heat shield 6. For instance, rather than a single seal ring, multiple seal rings may be provided to seal the shaft (seal boss) with respect of the bearing housing, and similarly multiple seal rings could be used to seal the shaft (seal boss) with respect to the heat shield in place of the single seal ring. In the embodiment of the invention described above, both seal rings are split overlapping rings. In alternative embodiments of the invention the second seal ring could be replaced by a simple non-overlapping split ring which could bring a cost saving.

In the embodiment of the invention shown in FIGS. 1 and 2, the heat shield is integral with the bearing/turbine housing. It will be appreciated that this may be replaced by a separate heat shield of, for example, pressed metal.

Figure 3:
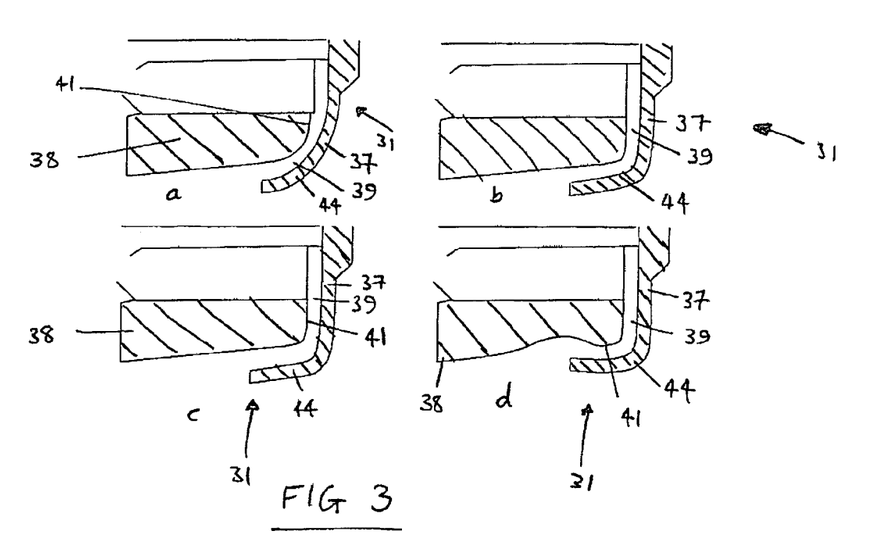

FIGS. 3a to 3d show alternative configurations of the diffuser passage 39 afforded by slightly different profiles of the intermediate section of the rotating wall 37. In the examples depicted the peripheral flange is omitted, as it may be in practice. The version depicted in FIG. 3a the curvature of the intermediate section 44 of the wall 37 has an approximately spherical form. In FIGS. 3b and 3c the intermediate section 44 of the wall 37 and the surface 41 of the wall 38 provide a more a more marked transition from the substantially radial part of the diffuser passage 39. In FIG. 3d the transition is more marked still and the profile of the facing wall 38 of the bearing housing is varied to provide a better disruptive barrier to the high velocity oil ejected.

In all embodiments of the diffuser 31 the facing surfaces 40, 41 of the fixed or rotating walls 37 or 38 may be roughened or made smooth to modify the interaction between the surface and the oil and therefore the oil flow characteristics.

Further configurations of the diffuser passage 39 are possible. In particular, the rotating wall 37 may be substantially planar in the manner, for example, of a flat disc with the facing surface of the bearing housing being configured, or adapted, to provide the divergent diffuser passage 39.

Figure 4:
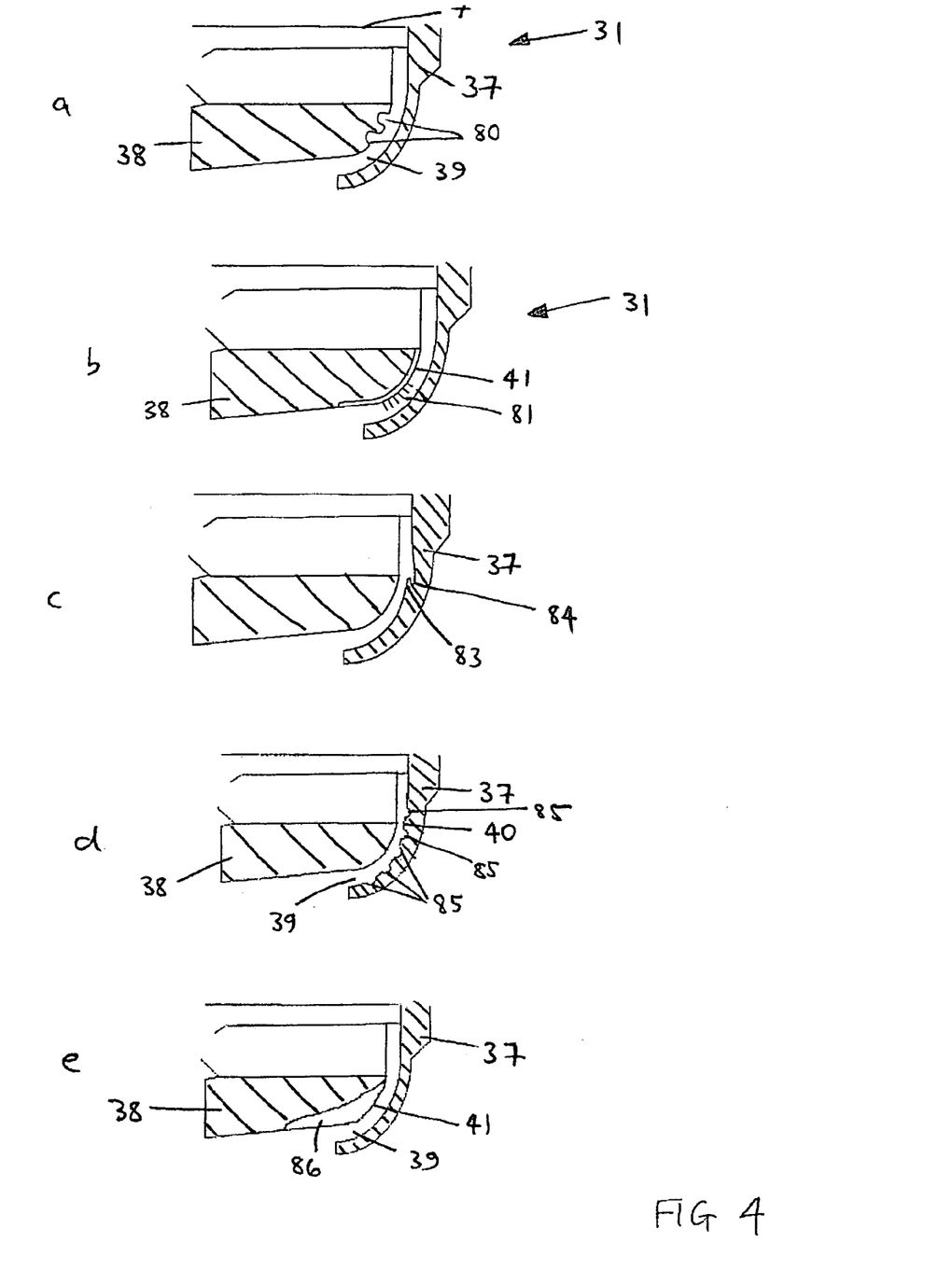
FIGS. 4a to 4e are further alternative embodiments of part of the oil diffuser.

In FIGS. 4a to 4e further alternative diffuser configurations are depicted. In the example of FIG. 4a the surface of the fixed wall 38 has a plurality of grooves 80 that serve to decrease the oil flow velocity as it travels along the passage 39. Any number of such grooves (including one) may be provided and they may be arranged in concentrically with each other around the axis of the shaft 7 or alternatively any regular or irregular array of grooves or other indentations may be provided.

In FIG. 4b the surface 41 of the fixed wall 38 is provided with a plurality of projections 81 designed to reduce the velocity of, and/or absorb energy from, the oil flow. They may be in the form of, for example, pillars, columns, spikes, needles, wires etc.

In FIG. 4c the rotating wall 37 of the diffuser 31 has a circumferential rib 83 that extends in a substantially radially inwards direction so as to define a trough 84 in which the oil may collect as it is ejected through the diffuser. This provides further flow disruption and absorbs energy from the oil. It will be appreciated that the rib and the trough may take any suitable form. FIG. 4d shows the surface 40 of the rotating wall 37 having a plurality of dimples 85 or the like to promote local turbulence in the oil flow so as to reduce the energy imparted to the oil from rotation of the wall. It will be understood that any appropriate surface disruption e.g. roughness or indentations may be used to achieve the same result.

In the embodiment of FIG. 4e, the surface 41 of the fixed wall 38 has groove 86 or cut-out extending in the direction of the passage 39 to collect and direct oil flow.

Figure 5:
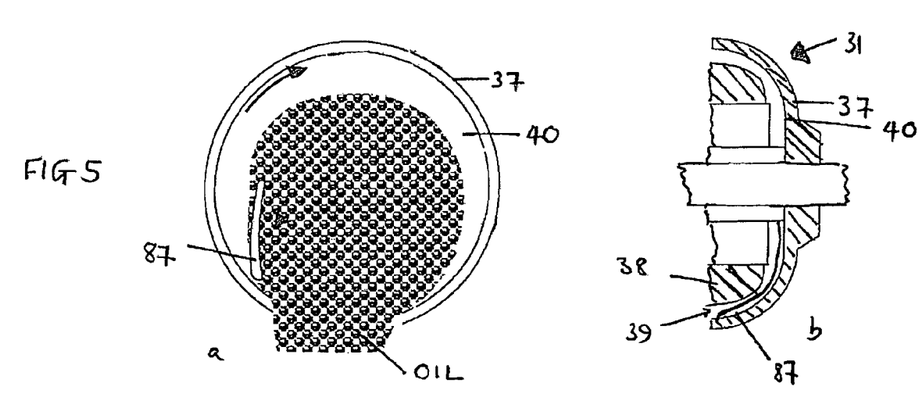

In the diffuser of FIGS. 5a and 5b a stationary vane 87 is provided on the surface 40 of the rotating wall 37 of the diffuser 31 such that it projects into the diffuser passage 39. This serves to modify the flow of oil by restricting or preventing its rotation with the wall.

The various embodiments described above serve to keep oil away from the potential leak path across the seal rings 15, 16 even when the negative pressure drop across those seals is relatively high.

The diffuser serves to remove energy from the oil flow in order to allow it to drain under the influence of gravity and without the risk of an oil mist or spray being produced. This is in contrast to oil slinger designs in which energy is imparted to the oil to direct it away from the potential leak site. The arrangement is a relatively simple structure and avoids using contacting sealing arrangements that are subject to wear of the need to provide a separate air supply to direct an air seal between the seal rings.

The size of the passage is such that it ensures the oil flows as a continuous body in contact with the opposing first and second surfaces that define the passage between them, rather than the oil being broken up into a spray in the manner of an oil slinger. The separation of the oil in this manner as a result of the ingress of air or of cavitation is to be avoided. The result is that the oil can pour from an outlet of the passage in a controllable fashion towards a suitable drain. Since turbochargers and power turbine are typically oriented in use with the shaft substantially horizontal the oil will pour from the bottom of the passage. The oil may egress from the passage within a limited angular range (e.g. less than 120 or 90 degrees).

Although described here in relation to an axial power turbine, it is to be understood that the sealing arrangement may be adopted on the shaft of a turbocharger, particularly at the compressor end. The oil diffuser and labyrinth 31, 32 could be used on the turbocharger shaft proximate to the compressor housing so as to prevent oil leakage into the compressor housing particularly during periods of operation when the boost pressure in the compressor is relatively low, for example, during extended use of a downstream exhaust brake that serves to reduce the rotation speed of the turbocharger, or in a switched or modulated two stage turbocharger.

It is to be appreciated that numerous modifications to the above-described embodiments may be made without departing from the scope of the invention as defined in the appended claims.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A rotating machine comprising:
    a housing defining a bearing cavity and a chamber separated by a first wall;
    a shaft rotatable about an axis in the bearing cavity and extending through an opening in the first wall, the shaft being mounted for rotation on a bearing assembly provided in the bearing cavity;
    an oil sealing arrangement for displacing oil away from the shaft as it rotates thereby restricting the flow of oil to the opening;
    the oil sealing arrangement comprising an oil diffuser device defining an oil diffuser passage disposed between opposed surfaces of the bearing assembly and the first wall, the oil diffuser passage being configured for guiding and diffusing oil flow, the oil diffuser passage extending outwardly of the axis and having a radially inner first portion that extends in a first direction with a dominant radial component and a second portion outboard of the radially inner portion and extending in a second direction with a greater axial component than the first direction; and
    wherein the oil diffuser device comprises a fixed member that is designed not to rotate with the shaft and defines a first surface, and a rotatable member for rotation with the shaft and defines a second surface, the first and second surfaces facing each other and defining the oil diffuser passage between them.

2. A rotating machine according to claim 1, wherein the oil diffuser passage has an outlet end distal from the shaft that extends in a direction away from the first wall.

3. A rotating machine according to claim 2, wherein the first portion of the oil diffuser passage has an inlet end that extends in a substantially radial direction.

4. A rotating machine according to claim 1, wherein the first surface has a first portion that extends in the first direction and a second portion that extends in the second direction, and the second surface has a first portion that extends in the first direction and a second portion that extends in the second direction.

5. A rotating machine according to claim 1, wherein the axial distance between the first and second surfaces increases with radial distance from the shaft.

6. A rotating machine according to claim 1, wherein the fixed member is defined by the housing.

7. A rotating machine according to claim 1, wherein the rotatable member of the diffuser device is substantially disc-shaped with a bore in which the shaft is received.

8. A rotating machine according to claim 7, wherein an outer periphery of the second surface of the rotatable member is curved in a direction away from the first wall.

9. A rotating machine according to claim 8, wherein the rotatable member is disposed in the bearing cavity such that there is a small annular clearance between its outer periphery and a neighbouring wall of the housing.

10. A rotating machine according to claim 1, wherein the oil sealing arrangement further comprises a labyrinth member disposed around the shaft for defining at least one oil collection chamber between the oil diffuser device and the first wall.

11. A rotating machine according to claim 10, wherein the at least one oil collection chamber is defined between the labyrinth member and a wall portion of the bearing cavity and is arranged to collect oil that passes through said small annular clearance.

12. A rotating machine according to claim 10, wherein the labyrinth member has at least one surface that is inclined with respect to the shaft axis for directing collected oil away from the shaft towards a drain.

13. A rotating machine according to claim 10, wherein there is provided a plurality of oil collection chambers arranged to receiving oil in sequence.

14. A rotating machine according to claim 1, wherein the sealing assembly further comprises at least one seal ring disposed around the shaft within the opening to seal the shaft with respect to the first wall.

15. A rotating machine according to claim 1 and in the form of a turbomachine.

16. A rotating machine according to claim 15, wherein the turbomachine is a turbocharger including a turbine or compressor housing defining the chamber, and a bearing housing defining said bearing cavity.

17. A rotating machine according to claim 15, wherein the turbomachine is a power turbine including a turbine housing defining the chamber, and a bearing housing defining said bearing cavity.

18. A rotating machine according to claim 1, wherein the oil diffuser passage is sized so as to ensure that when the oil emerges from the outlet the flow has decelerated such that the gravitational and surface tension forces dominate and cause the oil to pour from the outlet of the oil diffuser passage.

19. A rotating machine comprising:

a housing defining a bearing cavity and a chamber separated by a first wall;

a shaft rotatable in the bearing cavity about an axis and extending through an opening in the first wall, the shaft being mounted for rotation on a bearing assembly provided in the bearing cavity;

an oil sealing arrangement for displacing oil away from the shaft as it rotates thereby restricting the flow of oil to the opening;

the oil sealing arrangement comprising an oil diffuser device defining a substantially annular oil diffuser passage for guiding and diffusing the flow of oil towards an outlet, the oil diffuser passage being disposed between the bearing assembly and the first wall, the oil diffuser passage having a radially inner first portion that extends in a first direction with a dominant radial component and a second portion outboard of the radially inner portion and extending in a second direction with a greater axial component than the first direction, and the oil diffuser passage extending outwardly of the axis and being defined between first and second surfaces spaced apart such that, as the shaft rotates, oil flows along the oil diffuser passage as a body in contact with the first and second surfaces and decelerates such that gravitational and surface tension forces dominate and cause the oil to pour from the outlet of the oil diffuser passage.

* * * * *